United States Patent [19]
Hattori et al.

[11] Patent Number: 5,186,551
[45] Date of Patent: Feb. 16, 1993

[54] PRINTING APPARATUS FOR PRINTING RANDOMLY INPUT DATA IN ORDER

[75] Inventors: Hiroshi Hattori; Hideji Yoshimori, both of Nagoya; Kazuhiro Kondoh; Akira Madama, both of Yokohama, all of Japan

[73] Assignees: Brother Kogyo Kabushiki Kaisha, Nagoya; Hitachi Software Engineering Co., Ltd., Kanagawa, both of Japan

[21] Appl. No.: 515,672

[22] Filed: Mar. 7, 1990

Related U.S. Application Data

[63] Continuation of Ser. No. 258,640, Oct. 17, 1988, abandoned.

[30] Foreign Application Priority Data

Oct. 15, 1987 [JP] Japan ............................ 62-259889

[51] Int. Cl.⁵ .............................................. G06F 7/00
[52] U.S. Cl. ........................................ 400/61; 400/63; 400/279; 400/582; 395/116
[58] Field of Search ................ 400/61, 63, 67, 68, 400/76, 279, 582

[56] References Cited

U.S. PATENT DOCUMENTS

| | | | |
|---|---|---|---|
| 3,696,343 | 10/1972 | Schloss | 400/67 |
| 3,970,183 | 7/1976 | Robinson | 400/323 |
| 4,064,557 | 12/1977 | Bluethman | 400/68 |
| 4,180,335 | 12/1979 | Yamada | 400/76 |
| 4,240,075 | 12/1980 | Bringol | 400/63 |
| 4,270,865 | 6/1981 | Konishi | 400/63 |
| 4,321,670 | 3/1982 | Timmons | 400/67 |
| 4,417,322 | 11/1983 | Berry | 400/68 |
| 4,445,795 | 5/1984 | Levine | 400/68 |
| 4,553,860 | 11/1985 | Imaizumi | 400/68 |
| 4,684,274 | 8/1987 | Ueno | 400/320 |
| 4,861,175 | 8/1989 | Hori | 400/279 |

FOREIGN PATENT DOCUMENTS

| | | | |
|---|---|---|---|
| 3436811 | 4/1986 | Fed. Rep. of Germany | 400/76 |
| 11265 | 2/1981 | Japan | 400/63 |
| 0080084 | 5/1982 | Japan | 400/76 |
| 15181 | 1/1985 | Japan | 400/63 |
| 48509 | 9/1985 | Japan | 400/63 |
| 0206686 | 10/1985 | Japan | 400/76 |
| 158483 | 7/1986 | Japan | 400/63 |
| 84953 | 4/1988 | Japan | 400/63 |

*Primary Examiner*—David A. Wiecking
*Assistant Examiner*—Steven S. Kelley
*Attorney, Agent, or Firm*—Oliff & Berridge

[57] ABSTRACT

In a printing apparatus, even if print position data and its associated printing data are inputted at random in a memory, the print position data are rearranged in a predetermined order in which to move a printing heat at a minimum distance during the printing of the data in the specified position. Specifically, the print position data are rearranged so that the printing head is moved from the top of a printing paper toward the bottom thereof. If a plurality of position data are specified which are printed on the same line, the printing head is moved from the left to the right of the line.

14 Claims, 4 Drawing Sheets

PRINTING APPARATUS FOR PRINTING RANDOMLY INPUT DATA IN ORDER

This is a continuation of application Ser. No. 07/258,640 filed Oct. 17, 1988, now abandoned.

BACKGROUND OF THE INVENTION

The present invention relates to printing apparatuses, and more particularly to a printing apparatus provided with a function of repeatedly printing data in specified positions of each of a plurality of printing media.

Heretofore, printing apparatuses have been known in which printing is performed on a printing medium in accordance with input data. Some of such printing apparatuses are capable of printing data on specified print positions on a printing medium and this can be repeatedly effected for a plurality of printing media. This type of printing is performed in such a manner that a printing head is moved sequentially to specified positions on the printing medium; the positions of the so moved printing head is sequentially stored; and printing data to be printed in the specified positions are sequentially stored. Those operations are performed by a printing data setting means. Upon storage of the print positions and the associated printing data, the printing head is sequentially moved to the specified positions in accordance with the stored position data, and printing is carried out in accordance with the stored printing data. The latter operations are performed by a repetitive printing means.

In the conventional printing apparatus described above, the printing is carried out in the order that the print positions are specified and stored. Therefore, the printing may be carried out in a staggered fashion, that is, the printing paper moves back and forth with respect to a paper feeding direction. If the printing is carried out in such a staggered fashion, the paper feeding would not be performed smoothly, particularly when a continuous form printing paper is used. In addition, due to unmatching between the movement of the printing head and the paper feeding, the data may not be printed to the specified position on the printing paper, or a printing time may be excessively prolonged.

SUMMARY OF THE INVENTION

In view of the foregoing disadvantages accompanying the conventional printing apparatus, it is an object of the present invention to provide an improved printing apparatus in which paper feeding is smoothly performed and a printing time is shortened.

In order to achieve the above and other objects, the present invention provides a printing apparatus having a printing means (MB) for carrying out printing on a printing medium (MA) in accordance with printing data, which comprises, as shown in FIG. 1, a position specifying means (MD) for specifying at least two discontinuous print positions on the printing medium (MA) and providing position data for each of the print start positions; a moving means (MC) for moving the printing means (MB) to each of the print start positions in accordance with the position data; a memory means (ME) for storing the position data; an instruction means (MF) for issuing an instruction signal instructing to start printing; and a control means responsive to the instruction signal for controlling the moving means (MC) to move the printing means (MB) in a predetermined order in which to move the printing means the shortest distance in completing the printing in the specified print positions.

In operation, the print positions on the printing medium are specified by the position specifying means MD and in accordance therewith, the printing means MB is moved to the print positions by the moving means MC and at the same time the specified position data are sequentially stored in the memory means ME. The instruction means MF issues the instruction signal to the control means MG to start printing. In response to the instruction signal, the control means MG controls the moving means MC to move the printing means MB in the predetermined order so that the printing means MB is moved in an order that its moving distance is shortest in a locus of the printing head. The control means MG may be arranged so that while receiving the instruction signal from the instruction means MF, it rearranges the position data stored in the memory means ME.

DETAILED DESCRIPTION OF THE PREFERRED EMBODIMENTS

Referring to the accompanying drawings, description will be made with reference to a preferred embodiment of the invention in which the gist of the invention is applied to a word processor.

Figure 1:
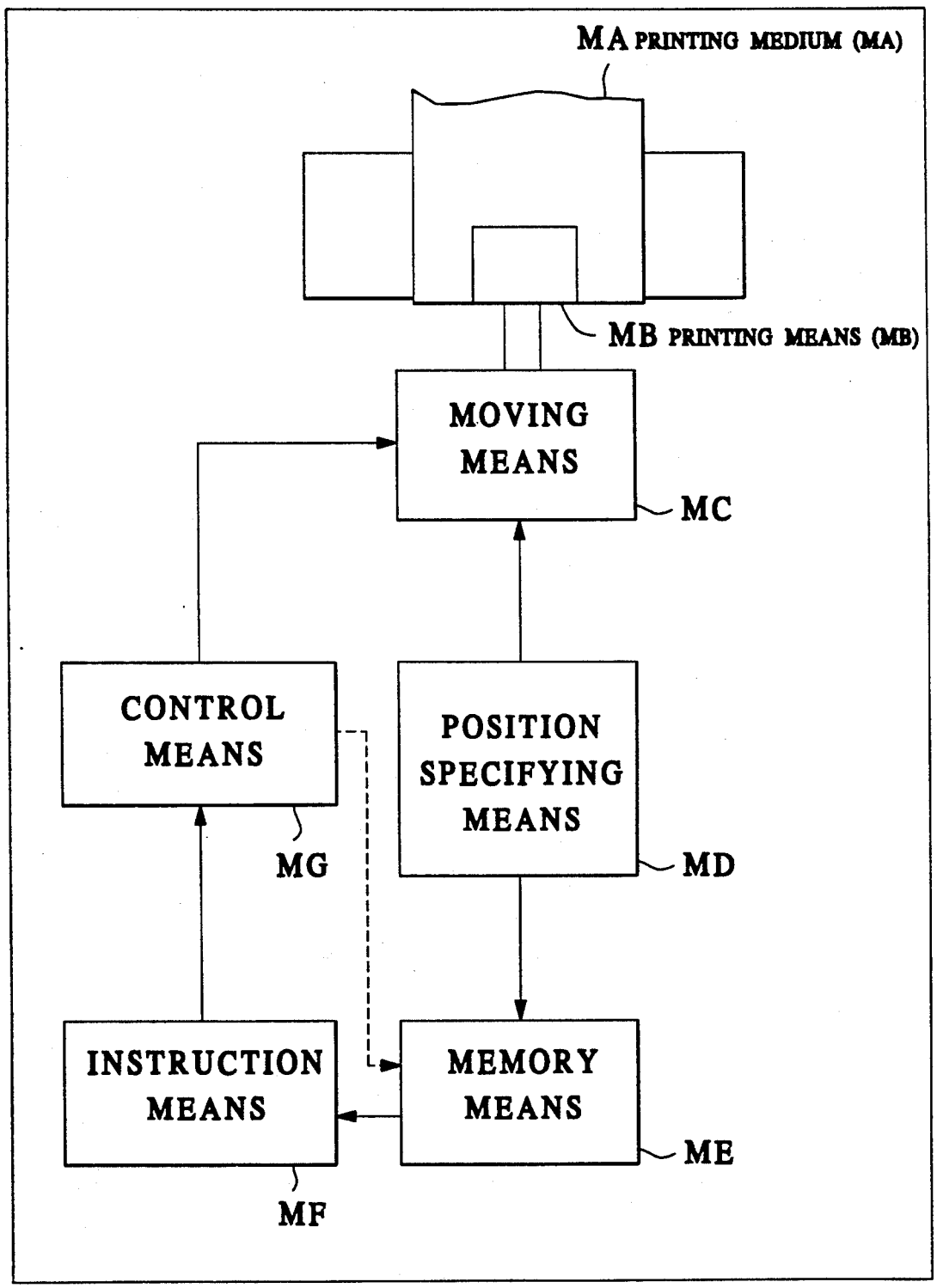
FIG. 1 is a block diagram showing a basic arrangement of a printing apparatus according to the present invention.
Figure 2:
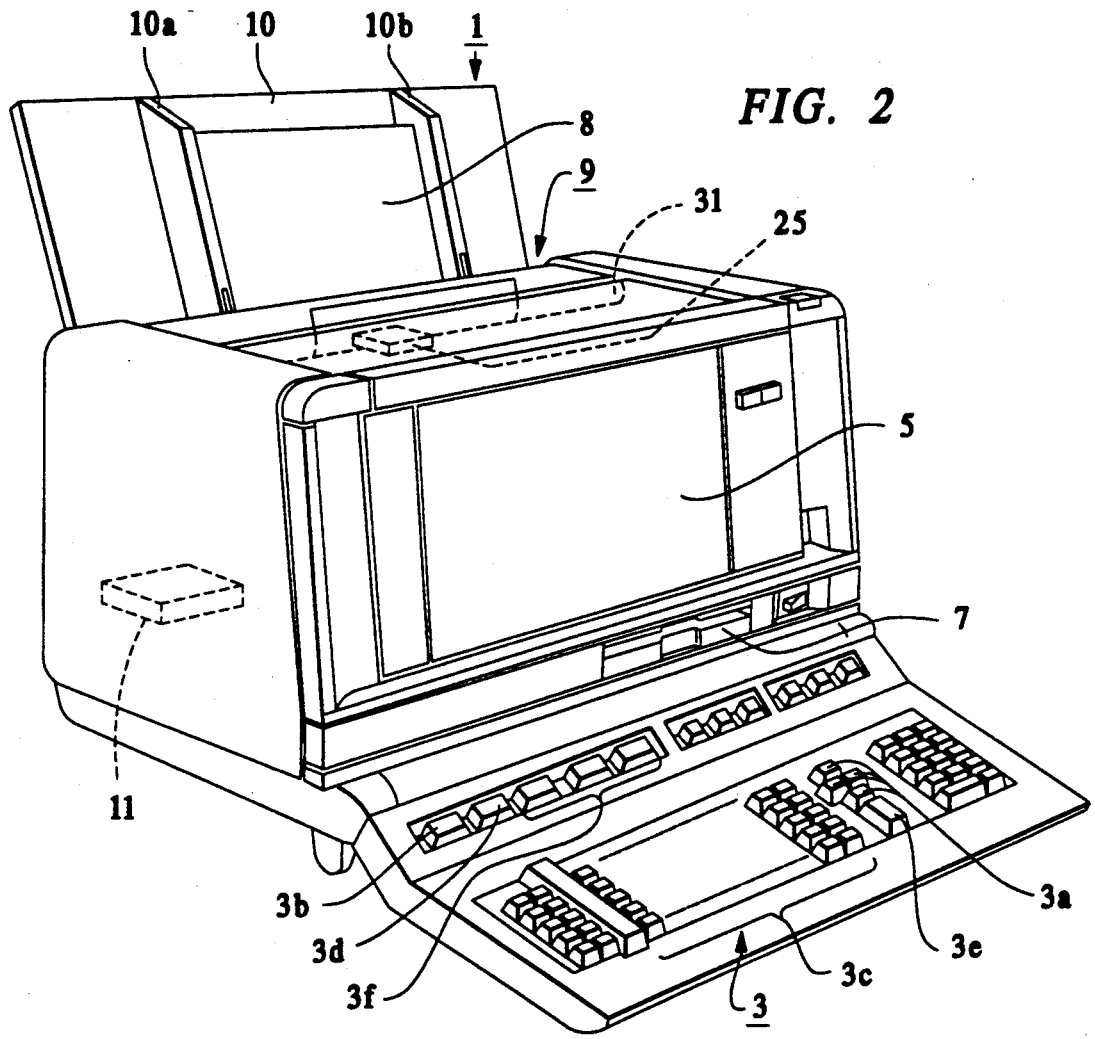
FIG. 2 is a schematic diagram showing a word processor embodying the present invention.

As shown in FIG. 2, the word processor 1 is comprised of a keyboard 3 for entering characters, printing positions, etc., a display unit 5 having a liquid crystal display for displaying characters, figures, etc., a floppy disk driver unit 7 for driving a floppy disk serving as an external storage, a thermal printer 9 for thermally printing characters, figures or the like, and an electronic control unit 11 for controlling input, edition and print of a document. To the rear portion of the printer 9, a paper feed unit 10 is attached for receiving and supplying print papers 8. A pair of paper set guide members 10a, 10b are horizontally movably provided in the front face of the paper feed unit 8. A horizontal position of the stack of the print papers is adjustable by mutually moving the guide members 10a, 10b. A paper sensor (not shown) is provided in an appropriate position of the printer 9 for sensing a leading edge of the print paper 8. With the paper set guide members 10a, 10b and the paper sensor, it is possible to determine a printing position on the printing paper 8 fed into the printer 9.

Figure 3:
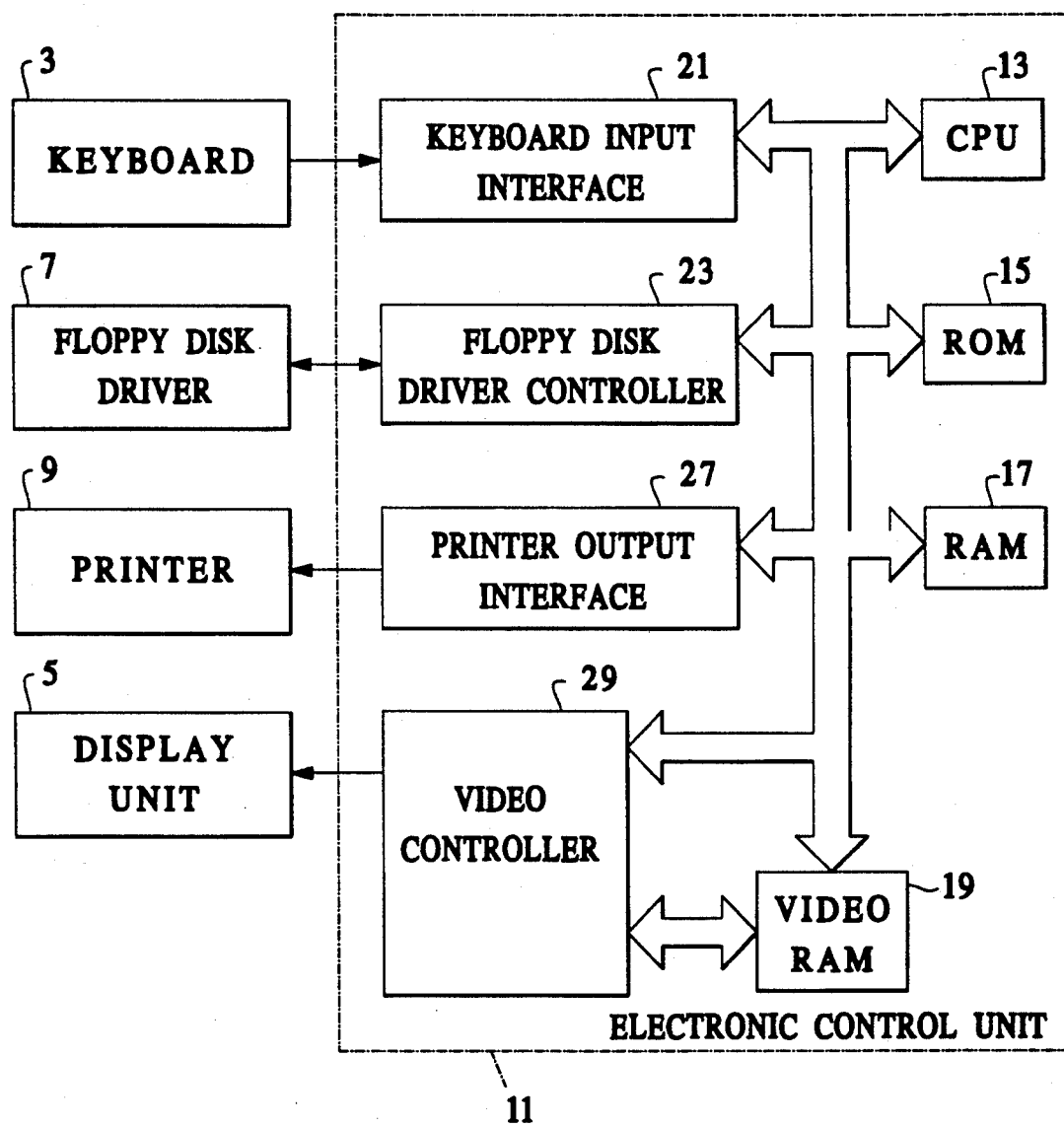
FIG. 3 is a block diagram showing an electronic control unit incorporated in the word processor shown in FIG. 3.

As shown in FIG. 3, the electronic control unit 11 includes a central processing unit (CPU) 13, read-only memory (ROM) 15, and a random access memory (RAM) 17, all of which are provided for carrying out logical processings. The electronic control unit 11 further includes a video RAM 19 for storing characters displayed on the display unit 5 and picture data such as printing data, a keyboard input interface 21 for entering data from the keyboard 3, a floppy disk driver controller 23 for controlling the floppy disk driver 7 to read data out of and write data into the floppy disk, a printer output interface 27 for outputting the printing data to a print head 25 and for controlling the position of the print head 25 of the printer 9 (see FIG. 2), and a video controller 29 for controlling the display unit 5 and outputting the picture data.

As shown in FIG. 2, the keyboard 3 has various kinds of keys, which are a head shift key 3a for shifting the print head 25; a position specifying key 3b for specifying the position of the print head 25; character keys for entering character data; a position set mode key 3d; print execution key 3e; and mode selection keys 3f for setting various kinds of modes.

The RAM 17 stores the print head position data and the character data both fed from the keyboard 3. The video RAM 19 stores the picture data written by the CPU 13 and is of a dual-port arrangement to allow access to both the CPU 13 and the video controller 29. The video controller 29 scans the video RAM 19 at a given interval and displays the picture data read out of the video RAM 19 on the display unit 5.

Figure 4:
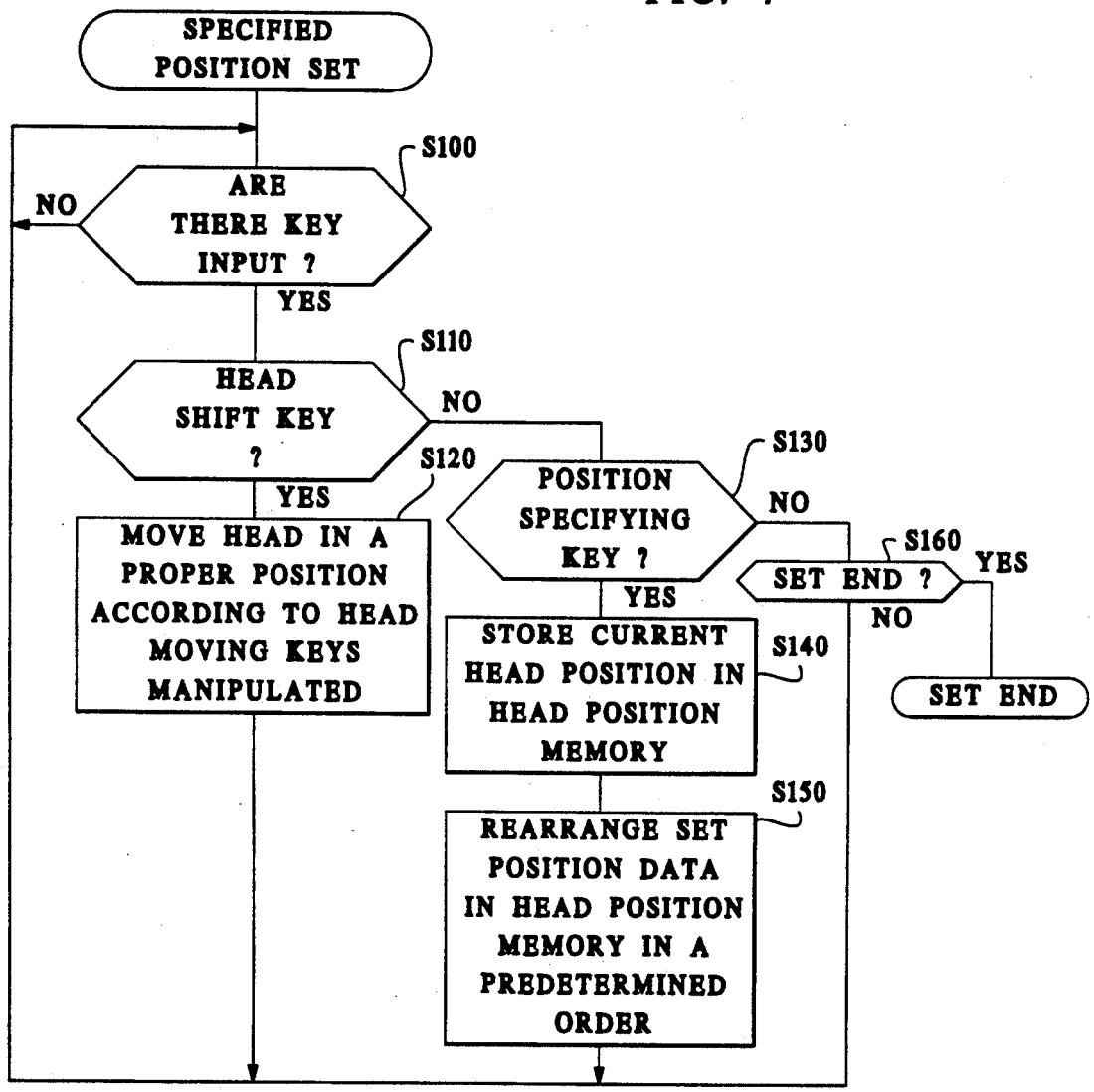
FIG. 4 is a flow chart describing a specified position set routine according to an embodiment of the invention.

With the arrangement as described above, the CPU 13 controls character input, message edition, picture display and printing in accordance with a specified position set routine stored in the ROM 15 and as illustrated in the flow chart of FIG. 4.

The routine implemented by the CPU 13 will be described with reference to the flow chart of FIG. 4. The routine is started in response to the depression of the position setting mode key 3d and is repeatedly executed until it is instructed that the position set end key (not shown) is depressed. Upon start of the implementation of the routine, it is firstly checked whether or not a key input is received from the keyboard 3 through the keyboard input interface 21 (step 100). When it is judged that there is no key input, this checking is repeatedly carried out. When it is judged that there is indeed the key input, the routine advances to the next step where it is checked whether or not it is the head shift key 3a that is depressed (step 110). When affirmative, the position of the print head 25 is caused to be actually moved in accordance with the contents inputted by the head shift key (step 120). Specifically, when the head shift key 3a is of "upward", a platen 31 (see FIG. 2) is rotated through the printer output interface 27 to move the print paper 8 downwardly. Thus, in the relative positional relationship, the position of the print head 25 is moved upwardly relative to the print sheet 8. When the head shift key 3a is of "downward", the print paper 8 is moved upwardly in the similar fashion. When the head shift key 3a is of "rightward", the print head 25 is moved rightwardly through the printer output interface 27. When "leftward", the print head 25 is moved leftwardly in the similar fashion.

When it is judged so that the head shift key 3a has not been depressed in accordance with the movement of the printing head 25 to the specified position on the printing paper 8 (step 110), it is next checked whether or not the position specifying key 3b is depressed (step 130). When it is judged that the position specifying key 3b has depressed, the current position of the printing head 25 is stored in a head position memory provided within the RAM 17 (step 140). This can be accomplished on the basis of column and row position data representing the position of the printing head 25. The row data is obtained from the output of the paper sensor and the paper feed amount. After the storage of the position data of the printing head 25, set position data of the printing head 25 stored in the head position memory are rearranged in an order from the uppermost one to the lowermost one (step 150). That is, from the top of the printing paper, the set position data is sequentially selected which renders the printing head move a shortest distance. When there exists a plurality of data representing the same line or row, such data are rearranged in such a manner that from the leftmost position of that line, the data is sequentially selected which renders the printing head to move a shortest distance. In this manner, the set position data stored in the head position memory are rearranged from the top of the printing paper and from the leftmost position if there are more than two data representing the same line.

When the keys manipulated (step 100) is neither of the head shift key 3a (step 110) nor the position specifying key 3b (step 130), it is checked whether or not the key manipulated is a position set end key (not shown) provided in the keyboard 3 (step 160). When negative, that is, when it is judged that the key manipulated is not the position set end key, the checking in step 100 is repeatedly carried out. If it is judged that the key manipulated is the position set end key, the routine is ended.

According to the routine indicated in the flow chart of FIG. 4, the set position data stored and then rearranged in the head position memory are sequentially read out when a print execution mode key (not shown) provided in the keyboard 3 is depressed in accordance with a print execution routine (now shown). As a result, the printing head 25 is sequentially moved to the specified printing positions identified by the sequentially read out position data. Since the printing head is moved from the top of the printing paper toward the bottom thereof and in the same printing line, from left to right, the printing head is efficiently moved and the paper feeding is smoothly effected. Meanwhile, when the printing head is moved to the specified position, printing of the associated position data is carried out.

As described above, in the word processor according to this embodiment, the set position data stored at random through manipulations of the head shift key 3a, position specifying key 3b, etc. are rearranged in a predetermined order in which to render the printing head 25 to move at a minimum distance, and the data thus rearranged is sequentially read out to thereby move the printing head to the specified positions in the most efficient order. This order is different from the order that the set position data are stored in the head position memory. As such, even if the position data of the printing head is inputted at random in order or position data is later supplemented, the printing head 25 is moved from the top of the printing paper toward the bottom thereof and from the left to right in the same printing line. Therefore, the platen 31 is not reversely rotated during printing but is rotated in the forward direction, so that the paper feeding speed is increased and no inconvenience is introduced attendant to the reverse movement of the platen. As a result, not only the printing speed but also the printing quality is improved to a greater extent. This is particularly advantageous in the case of printing the same contents of the printing data for a plurality of printing papers.

Although the present invention has been described with reference to a specific embodiment, the scope of the present invention is not limited thereto but a variety of changes and modifications may be made without departing from the scope and spirit of the invention. For example, the set position data stored in the head position memory is left as it stands, and rearrangement of the data may be implemented at the time when those data are read out for printing. Alternately, the data may be read out from the memory in an order from that for the top of the printing paper to that for the bottom thereof. In the embodiment described above, although the position of the head is moved through manipulations of the head shift key 3a to specify the print position, the printing head 25 may not be moved for attaining this purpose. That is, without actually moving the printing head 25, numeral position data representing a particular position on the printing paper may be inputted through manipulations of position instruction keys.

What is claimed is:

1. A printing apparatus having printing means for carrying out printing on a printing medium in accordance with printing data, the printing medium having a plurality of printable positions, each printable position being defined by a corresponding one of a plurality of consecutive column numbers and a corresponding one of a plurality of consecutive line numbers, said apparatus comprising:

moving means for moving printing means relative to the printing medium;

position specifying means for specifying a print position on the printing medium, said position specifying means comprising at least one head shift key for instructing said moving means to move said printing means to an arbitrary print position and a position specifying key for specifying the arbitrary print position as the print position by column number and line number on the printing medium, at least two print positions being specified at random, said position specifying key providing position data indicative of the specified print positions when depressed;

memory means for storing the position data in the order received from said position specifying key;

instruction means for issuing an instruction signal instructing to start printing; and control means responsive to said instruction signal for controlling said moving means to move said printing means in a predetermined order in which said printing means is moved while completing the printing along a shortest distance path between the specified print positions.

2. The apparatus according to claim 1, wherein each of said print positions on the printing medium is defined by a row number and a column number, and wherein said printing means moves horizontally in column number order.

3. The apparatus according to claim 1, wherein each of said print positions on the printing medium is defined by a row number and a column number, and wherein said printing means further moves vertically in row number order.

4. The apparatus according to claim 2, wherein said printing means further moves vertically in row number order.

5. The apparatus according to claim 1, wherein the printing data is inputted when each of the print positions is specified.

6. The apparatus according to claim 5, wherein the printing data is further stored in said memory means in association with the position data.

7. The apparatus according to claim 6, wherein printing is carried out independently of an order that the print positions are specified.

8. A printing apparatus having printing means for carrying out printing on a printing medium in accordance with printing data, the printing medium having a plurality of printable positions, each printable position being defined by a corresponding one of a plurality of consecutive column numbers and a corresponding one of a plurality of consecutive line numbers, said apparatus comprising:

moving means for moving said printing means relative to the printing medium;

position specifying means for specifying a print position on the printing medium, said position specifying means comprising at least one head shift key for instructing said moving means to move said printing means to an arbitrary print position and a position specifying key for specifying the arbitrary print position as the print position by column number and line number on the printing medium, at least two print positions being specified at random, said position specifying key providing position data indicative of the specified print positions when depressed;

memory means for storing the position data in the order received from said position specifying key;

instruction means for issuing an instruction signal instructing to start printing; and control means responsive to said instruction signal for rearranging the position data stored in said memory means in a predetermined order and controlling said moving means with the position data rearranged in the predetermined order in which said printing means is moved while completing the printing along a shortest distance path between the specified print positions.

9. The apparatus according to claim 8, wherein each of said print positions on the printing medium is defined by a row number and a column number, and wherein said printing means moves horizontally in column number order.

10. The apparatus according to claim 8, wherein each of said print positions on the printing medium is defined by a row number and a column number, and wherein said printing means moves vertically in row number order.

11. The apparatus according to claim 9, wherein said printing means further moves vertically in row number order.

12. The apparatus according to claim 8, wherein the printing data is inputted when each of the print positions is specified.

13. The apparatus according to claim 12, wherein the printing data is further stored in said memory means in association with the position data.

14. The apparatus according to claim 13, wherein printing is carried out independently of an order that the print positions are specified.

* * * * *